United States Patent
Han

(10) Patent No.: US 12,040,673 B2
(45) Date of Patent: Jul. 16, 2024

(54) MOTOR

(71) Applicant: NIDEC CORPORATION, Kyoto (JP)

(72) Inventor: Xiaoli Han, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 302 days.

(21) Appl. No.: 17/701,685

(22) Filed: Mar. 23, 2022

(65) Prior Publication Data
US 2022/0311298 A1 Sep. 29, 2022

(30) Foreign Application Priority Data
Mar. 29, 2021 (JP) ................. 2021-054646

(51) Int. Cl.
*H02K 3/28* (2006.01)
*H02K 3/12* (2006.01)

(52) U.S. Cl.
CPC .................. *H02K 3/28* (2013.01); *H02K 3/12* (2013.01)

(58) Field of Classification Search
CPC .............. H02K 1/16; H02K 3/12; H02K 3/28
See application file for complete search history.

(56) References Cited

U.S. PATENT DOCUMENTS

| | | | |
|---|---|---|---|
| 10,236,757 B2 | 3/2019 | Nakayama et al. | |
| 2006/0163959 A1* | 7/2006 | Ogawa | H02K 3/38 310/201 |
| 2008/0136284 A1* | 6/2008 | Fujii | H02K 3/12 310/214 |
| 2012/0293024 A1* | 11/2012 | Yokogawa | H02K 3/522 310/43 |
| 2013/0014381 A1* | 1/2013 | Kayukawa | H02K 15/0478 29/596 |
| 2016/0329764 A1* | 11/2016 | Mizutani | H02K 3/12 |
| 2017/0117768 A1* | 4/2017 | Nakamura | H02K 3/28 |

FOREIGN PATENT DOCUMENTS

JP 2020114116 A 7/2020

* cited by examiner

*Primary Examiner* — Gary A Nash
(74) *Attorney, Agent, or Firm* — HAUPTMAN HAM, LLP

(57) ABSTRACT

In one aspect of the present invention, a motor includes a rotor that is rotatable about a center axis line and a stator that is disposed on a radial outside of the rotor. The stator includes a winding portion including a plurality of conductor connection bodies in which a plurality of conductors are connected in series and a stator core in which a plurality of slots through which the conductor connection body passes are provided. The winding portion includes a neutral point portion located on one side in the axial direction of the stator core, ends of the three conductor connection bodies being electrically connected to the neutral point portion. The neutral point portion includes two connection portions to which two of different combinations of the ends of the three conductor connection bodies are connected.

6 Claims, 7 Drawing Sheets

MOTOR

CROSS-REFERENCE TO RELATED APPLICATIONS

The present invention claims priority under 35 U.S.C. § 119 to Japanese Patent Application No. 2021-054646 filed on Mar. 29, 2021, the entire content of which is incorporated herein by reference.

FIELD OF THE INVENTION

The present invention relates to a motor.

BACKGROUND

In a motor for an electric vehicle, a winding structure using a segment coil is currently studied for the purpose of improving efficiency. Conventionally, there is known a structure in which a flat wire of a three-phase segment coil is connected together in one place to form a neutral point.

In the conventional structure, because the three-phase flat wire is extended in a circumferential direction and connected together in one place, the connection portion at a tip becomes a cantilever structure, and the load applied to the connection portion becomes large against vibration.

SUMMARY

In one aspect of the present invention, an exemplary motor includes a rotor that is rotatable about a center axis line and a stator that is disposed on a radial outside of the rotor. The stator includes a winding portion including a plurality of conductor connection bodies in which a plurality of conductors are connected in series and a stator core in which a plurality of slots through which the conductor connection body passes are provided. The winding portion includes a neutral point portion located on one side in the axial direction of the stator core, end portions of the three conductor connection bodies being electrically connected to the neutral point portion. The neutral point portion includes two connection portions to which two of different combinations of the end portions of the three conductor connection bodies are connected.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is a vertical direction in which a positive side is an "upper side" and a negative side is a "lower side". A center axis line J appropriately illustrated in each drawing is a virtual line that is parallel to the Z-axis direction and extends in the vertical direction. In the following description, an axial direction of the center axis line J, namely, the direction parallel to the vertical direction is simply referred to as an "axial direction", the upper side is referred to as a "one side in the axial direction", and the lower side is referred to as "the other side in the axial direction". Sometimes a radial direction about the center axis line J is simply referred to as a "radial direction". Furthermore, sometimes the circumferential direction centered on the center axis line J is simply referred to as the "circumferential direction", a counterclockwise direction when viewed from above is referred to as "one side in the circumferential direction", and a clockwise direction when viewed from above is referred to as "the other side in the circumferential direction".

The vertical direction, the upper side, and the lower side are merely names for describing an arrangement relationship between respective units, and an actual arrangement relationship and the like may be other than the arrangement relationship indicated by these names. Furthermore, the directions described as one side in the axial direction and the other side in the axial direction can reproduce an effect of the embodiment even when they are replaced with each other. Similarly, the directions described as one side in the circumferential direction θ1 and the other side in the circumferential direction θ2 can reproduce the effect of the embodiment even when they are replaced with each other.

Figure 1:
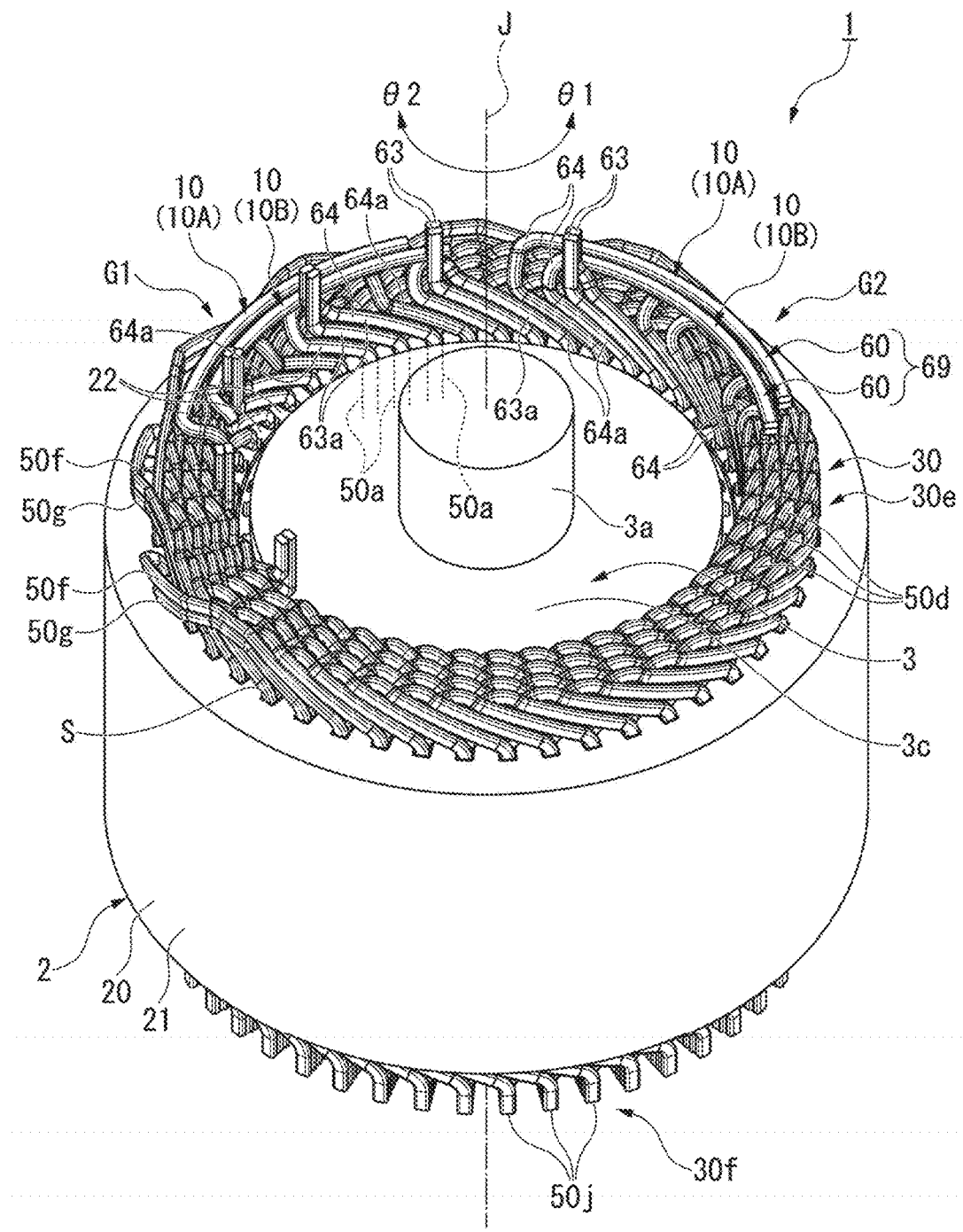
FIG. 1 is a perspective view illustrating a motor according to an embodiment.
Figure 2:
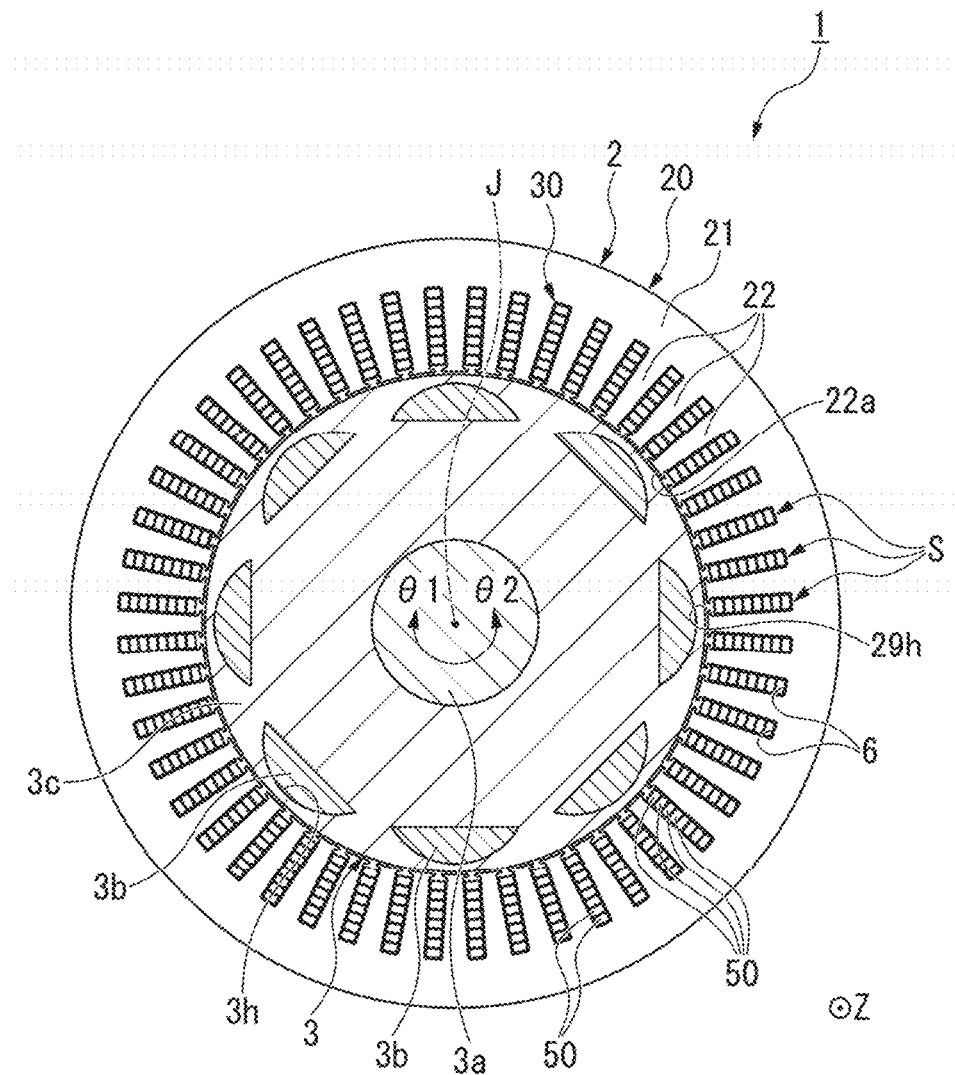
FIG. 2 is a sectional view illustrating the motor of the embodiment.

FIG. 1 is a perspective view illustrating a motor 1 according to an embodiment. FIG. 2 is a sectional view of the motor 1.

As illustrated in FIG. 1, the motor 1 of the embodiment is an inner rotor type motor. Furthermore, the motor 1 of the embodiment is a three-phase AC motor. The center of the motor 1 is the center axis line J.

The motor 1 includes a rotor 3 and a stator 2. The motor 1 may include a bus bar unit (not illustrated). In this case, the bus bar unit is disposed above the stator 2 and connected to the stator 2.

As illustrated in FIG. 2, the rotor 3 is disposed on the radial inside of the annular stator 2. That is, the rotor 3 is opposed to the stator 2 in the radial direction. The rotor 3 includes a shaft 3a, a rotor magnet 3b, and a rotor core 3c. The rotor 3 is rotatable about the center axis line J.

The shaft 3a extends in an axial direction along a center axis line J. The shaft 3a has a columnar shape centered on the center axis line J and extending in the axial direction. The shaft 3a is supported by a bearing (not illustrated) so as to be rotatable about the center axis line J.

The rotor core 3c has a cylindrical shape extending in the axial direction. The rotor core 3c is configured by stacking magnetic steel sheets. An inner peripheral surface of the rotor core 3c is fixed to an outer peripheral surface of the shaft 3a. A holding hole 3h into which the rotor magnet 3b is inserted and fixed is made in the rotor core 3c.

The rotor magnet 3b is opposed to the stator 2 in the radial direction. The rotor magnet 3b is held while embedded in the rotor core 3c. The rotor magnet 3b of the embodiment has eight poles. A number of poles of the rotor 3 is not limited to the embodiment. Furthermore, the rotor magnet 3b may be a magnet of another form such as an annular ring magnet.

The stator 2 is arranged to the rotor 3 in the radial direction with a gap interposed therebetween. In the embodiment, the stator 2 is arranged on the radially outside of the rotor 3. The stator 2 includes a stator core 20, a winding portion 30, and a plurality of insulating papers 6.

The stator core 20 has the annular shape centered on the center axis line J. The stator core 20 consists of electromagnetic steel sheets stacked along the axial direction. The stator core 20 includes a core back 21 having an annular shape centered on the center axis line J and a plurality of teeth 22 extending radially inward from the core back 21.

The plurality of teeth 22 are arranged at regular intervals in the circumferential direction. An umbrella 22a is provided at a tip portion on the inside in the radial direction of the teeth 22. The umbrella 22a projects on both sides in the circumferential direction with respect to the teeth 22. That is, a dimension in the circumferential direction of the umbrella 22a is larger than a dimension in the circumferential direction of the teeth 22. The surface of the umbrella 22a facing inward in the radial direction is opposite to the outer peripheral surface of the rotor 3 in the radial direction with a gap interposed therebetween.

The winding portion 30 is mounted on the teeth 22. A slot S is provided between the teeth 22 adjacent to each other in the circumferential direction. That is, a plurality of slots S arranged in the circumferential direction are provided in the stator core 20.

A conductor 50 of the winding portion 30 is accommodated in the slot S. The insulating paper 6 is arranged one by one in the slot S. The insulating paper 6 secures insulation between the winding portion 30 and the stator core 20 in the slot S.

A plurality of layers arranged in the radial direction are provided in one slot S. In one slot, one conductor 50 is placed on each layer. In the slot S, a plurality of conductors 50 are arranged in a row along the radial direction.

The slot S includes an opening 29h that is open radially inward. The opening 29h is located between the umbrellas 22a located at the tips of the adjacent teeth 22. A width dimension along the circumferential direction of the opening 29h is smaller than the dimension along the circumferential direction of the conductor 50. For this reason, the conductor 50 is difficult to pass through the opening 29h, and the conductor 50 is prevented from being separated from the stator core 20.

In the embodiment, the stator core 20 has 48 teeth 22. That is, the stator 2 of the embodiment has 48 slots. The number of slots of the stator 2 is appropriately set according to the number of poles of the rotor magnet 3b and a method for winding the winding portion 30.

Figure 3:
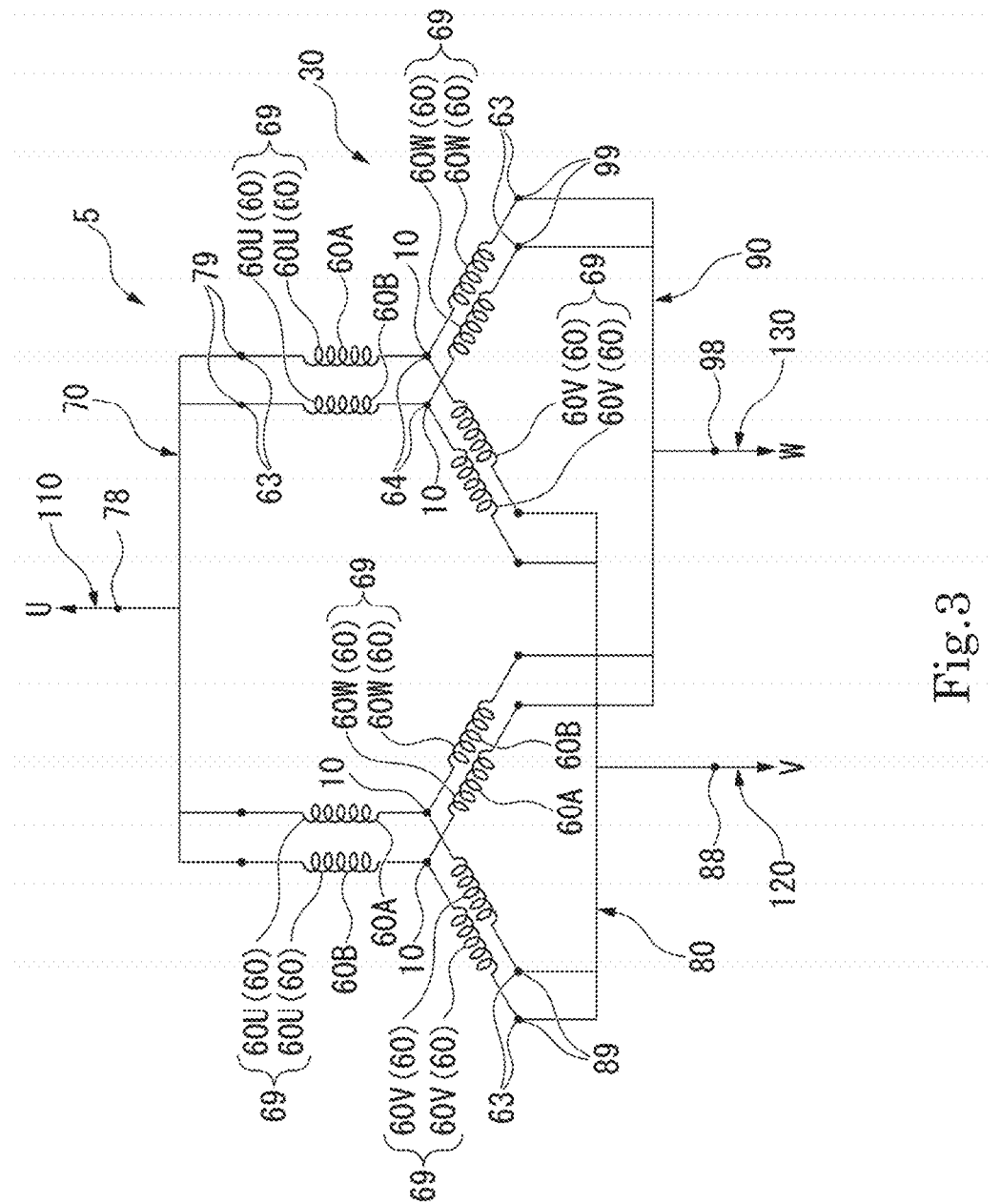
FIG. 3 is a schematic view illustrating a circuit configured by a winding portion of the embodiment.

FIG. 3 is a schematic view illustrating a circuit configured by the winding portion 30 of the embodiment.

The winding portion 30 of the embodiment includes a plurality of (12 in the embodiment) conductor connection bodies 60 to configure a segment coil. The 12 conductor connection bodies 60 are classified into 4 U-phase conductor connection bodies (first phase conductor connection bodies) 60U, 4 V-phase conductor connection bodies (second phase conductor connection bodies) 60V, and 4 W-phase conductor connection bodies (third phase conductor connection bodies) 60W.

Two of the four conductor connection bodies 60 having the same phase pass through the adjacent slots S and are mounted on the stator core 20. In the present specification, two conductor connection bodies 60 passing through the adjacent slots S are referred to as the connection body pair 69. Furthermore, in the following description, when two conductor connection bodies 60 forming the connection body pair 69 are distinguished from each other, one is referred to as a first conductor connection body 60A and the other is referred to as a second conductor connection body 60B.

The conductor connection body 60 includes a first end 63 and a second end (end) 64. The first end 63 and the second end 64 are provided at one end and the other end of the conductor connection body 60, respectively. The conductor connection body 60 is mounted on the stator core 20 between the first end 63 and the second end 64 to configure a coil of each phase. The conductor connection body 60 is connected to the bus bar unit 5 in the first end 63 and the second end 64.

The second ends 64 of the U-phase conductor connecting body 60U, the V-phase conductor connecting body 60V, and the W-phase conductor connecting body 60W are connected to each other to configure a neutral point portion 10. That is, the winding portion 30 includes the neutral point portion 10 to which the second ends 64 of the three conductor connection bodies 60 are electrically connected.

The neutral point portion 10 is a neutral point of a Y-connected three-phase circuit. The ends of the U-phase conductor connection body 60U, the V-phase conductor connection body 60V, and the W-phase conductor connection body 60W are Y-connected by providing the neutral point portion 10. In the embodiment, four Y-connections corresponding to the four conductor connection bodies 60 of each phase are configured, and the Y-connections are connected in parallel. That is, the plurality of conductor connection body 60 are 4Y-connected.

The first ends 63 of the four U-phase conductor connection bodies 60U are connected to one U-phase bus bar 70. The first ends 63 of the four V-phase conductor connection bodies 60V are connected to one V-phase bus bar 80. The first ends 63 of the four W-phase conductor connection bodies 60W are connected to one W-phase bus bar 90. Alternating currents in which the phases are shifted by 120° from one another are passed through the U-phase bus bar 70, the V-phase bus bar 80, and the W-phase bus bar 90.

According to the embodiment, four in-phase conductor connection bodies 60 are connected to one phase bus bar 70, 80, 90. That is, the winding portion 30 of the embodiment includes four conductor connection bodies 60 in each of the three phases, and the conductor connection bodies 60 of each phase are connected in parallel to each other by the phase bus bars 70, 80, 90.

In the embodiment, the case where the winding portion 30 includes four conductor connection bodies 60 having the same phase has been described. However, when the winding portion 30 includes at least two conductor connection bodies 60, and when these conductor connection bodies 60 configure a connection body pair 69 passing through the adjacent slots S in the circumferential direction, the winding configuration similar to that of the embodiment can be obtained. Accordingly, the plurality of conductor connection bodies 60 need only have Y-connections of 2×M with M as a natural number (M=2 in the embodiment).

Figure 4:
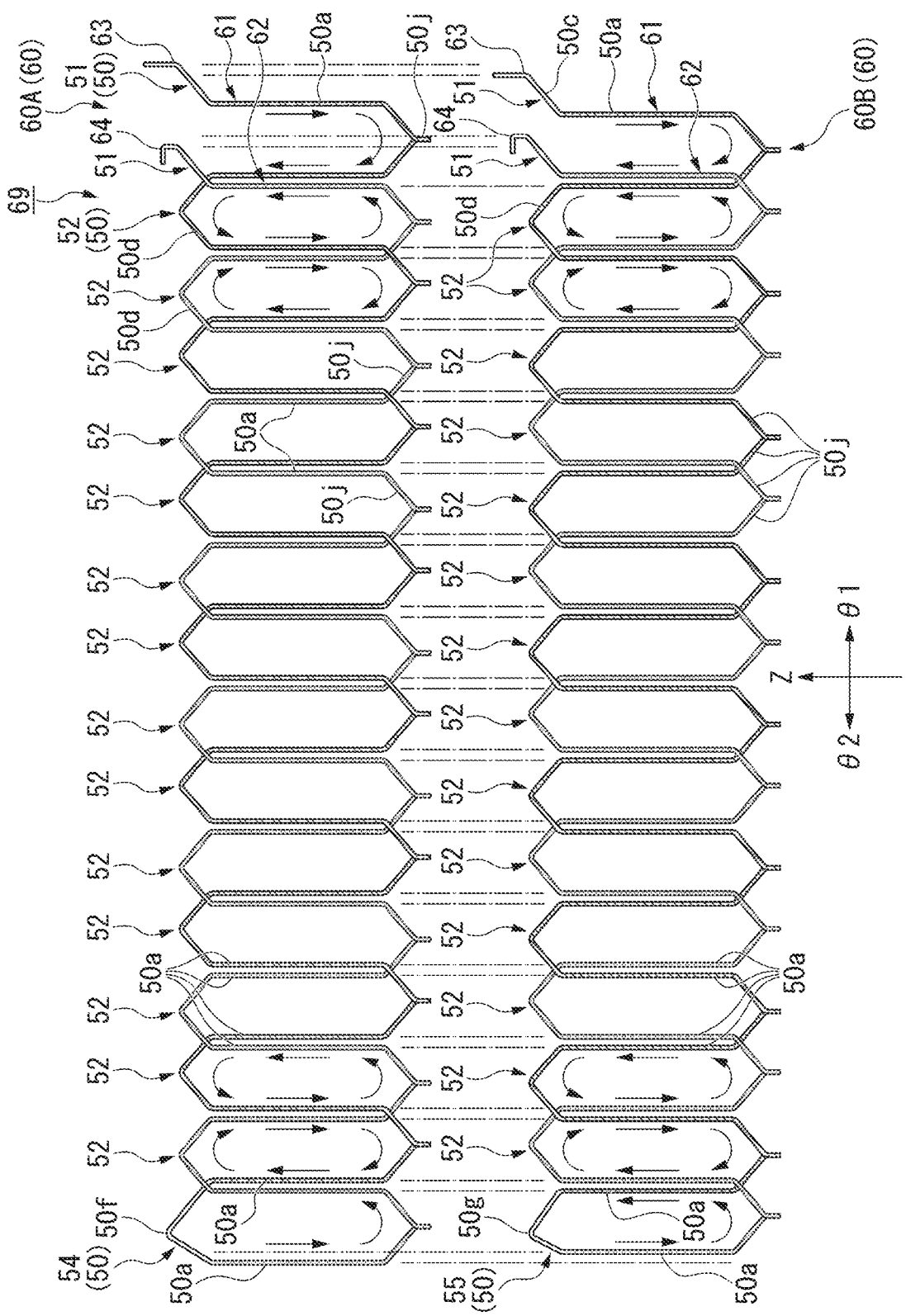
FIG. 4 is a schematic diagram illustrating a winding configuration of a conductor connection body of the embodiment.

FIG. 4 is a schematic diagram illustrating a winding configuration of two conductor connection bodies 60 forming the connection body pair 69.

As illustrated in FIG. 4, the conductor connection body 60 is configured by connecting the plurality of conductors 50 in series. Each conductor 50 is configured by bending a flat wire. Accordingly, a space factor of the conductor 50 in the slot S can be improved as compared with the case of using a round wire. In the present specification, the "flat wire" is a wire rod having a quadrangular sectional shape or a substantially quadrangular sectional shape. In the present specification, the term "substantially square shape" includes a square shape with rounded corners. Although not illustrated, the conductor 50 in the embodiment has an enamel coating on the surface.

The plurality of conductors 50 configuring the conductor connection body 60 are classified into an end conductor 51, a hairpin conductor 52, a first folded conductor 54, and a second folded conductor 55.

Each of the various conductors 50 includes at least a straight portion 50a extending linearly along the axial direction (Z-direction) and a connection portion 50j located at the lower end of the lower side (the other side in the axial direction). The straight portion 50a passes through the slot S. That is, the conductor connection body 60 is accommodated in the slot S in the straight portion 50a. The conductor connection body 60 extends to the upper side and the lower side of the stator core 20 in a region other than the straight portion 50a. The portions extending from the upper side and the lower side of the stator core 20 configure a coil end 30e (see FIG. 1) of the stator core 20.

A connection portion 50j is connected to a connection portion 50j of another conductor 50. The connection portions 50j of the pair of conductors 50 are joined to each other by joining means such as welding. The connection portion 50j is bent in the circumferential direction after the conductor 50 is mounted on the stator core 20, and the connection portion 50j is welded to the connection portion 50j of another conductor 50. In the conductor 50 before mounting on the stator core 20, the connection portion 50j has a straight shape continuous to the straight portion 50a. The conductor 50 is attached to the stator core 20 by inserting the connection portion 50j and the straight portion 50a into the slot S from the upper side (one side in the axial direction) of the stator core 20. The connection portion 50j is bent in the circumferential direction and welded to another connection portion 50j, so that the conductor 50 is prevented from being axially detached from the stator core 20.

The plurality of conductors 50 are inserted into the slot S of the stator core 20 from the upper side and joined on the lower side, so that the stator 2 of the embodiment can be assembled. Consequently, a complicated assembly process is not required, but an assembly process can be simplified.

Various conductors 50 will be described below.

The end conductor 51 includes each one of the ends 63, 64, one straight portion 50a, and one connection portion 50j. In the end conductor 51, the ends 63, 64 extend while being inclined on one side θ1 in the circumferential direction from the upper end toward the upper side of the straight portion 50a, and the connection portion 50j extends while being inclined on the other side θ2 in the circumferential direction from the lower end toward the lower side of the straight portion 50a. That is, in the end conductor 51, the ends 63, 64 and the connection portion 50j extend in the direction opposite to the circumferential direction with respect to the straight portion 50a.

The two ends 63, 64 are provided at both end portions of the conductor connection body 60, respectively. In the two ends 63, 64, one is the first end 63 and the other is the second end 64. As illustrated in FIG. 3, the first end 63 is connected to the phase bus bars 70, 80, 90. The second end 64 is connected to the second end 64 of another phase to configure the neutral point portion 10. The structure of the second end 64 will be connected in detail in the latter part using FIG. 5 and the like.

As illustrated in FIG. 4, the hairpin conductor 52 includes two straight portions 50a, two connection portions 50j, and one crossing portion 50d. The crossing portion 50d is arranged at the upper end portion of the hairpin conductor 52. The crossing portion 50d connects two straight portions 50a to each other. That is, in the hairpin conductor 52, two straight portions 50a are connected to each other through the crossing portion 50d. In the hairpin conductor 52, two connection portions 50j are connected to the lower ends of different straight portions 50a. The plurality of crossing portions 50d project from the upper end surface (one side in the axial direction) of the stator core 20. That is, some of the plurality of conductors 50 include the crossing portion 50d connecting the slots S on the upper side of the stator core 20.

In the hairpin conductor 52, two straight portions 50a are lined up with the number of slots per pole s. At this point, the number of slots per pole s means the number of slots S of the stator 2 arranged between magnetic poles of the rotor 3 in the combination of the rotor 3 and the stator 2. The number of slots per pole s is calculated by (the total number of slots in the stator 2)/(the number of magnetic poles in the rotor 3). In the embodiment, the number of magnetic poles of the rotor 3 is 8, and the number of slots of the stator 2 is 48, so that the number of slots per pole s is 6. In the hairpin conductor 52, the two straight portions 50a are separated from each other by six slots in the circumferential direction.

In the hairpin conductor 52, two connection portions 50j are bent in opposite directions in the circumferential direction. In two connection portions 50j, one located on one side θ1 in the circumferential direction extends from the lower end of the straight portion 50a to the other side θ2 in the circumferential direction, and the other located on the other side θ2 in the circumferential direction extends from the lower end of the straight portion 50a to one side θ1 in the circumferential direction.

The first folded conductor 54 includes two straight portions 50a, two connection portions 50j, and one first folded portion (folded portion) 50f. Similarly, the second folded conductor 55 includes two straight portions 50a, two connection portions 50j, and one second folded portion (folded portion) 50g. The first folded portion 50f and the second folded portion 50g are arranged at the upper end portion of the first folded conductor 54 or the second folded conductor 55.

The first folded portion 50f and the second folded portion 50g connect the two straight portions 50a to each other. That is, in the first folded conductor 54 and the second folded conductor 55, the two straight portions 50a are connected to each other through the first folded portion 50f or the second folded portion 50g.

In the first folded conductor 54 and the second folded conductor 55, two connection portions 50j are bent in one side θ1 in the circumferential direction. That is, in the first folded conductor 54 and the second folded conductor 55, the two connection portions 50j extend from the lower end of the straight portion 50a to one side θ1 in the circumferential direction.

In the first folded conductor 54 and the second folded conductor 55, distances between the two straight portions 50a are different from each other. In the first folded conductor 54, the two straight portions 50a are arranged in the circumferential direction with the number of slots per pole s+1 (7 slots in the embodiment). On the other hand, in the second folded conductor 55, the two straight portions 50a are arranged in the circumferential direction with the number of slots per pole s−1 (5 slots in the embodiment). For this reason, the first folded portion 50*f* has a larger crossing amount in the circumferential direction by two slots than the second folded portion 50*g*. One first folded conductor 54 is provided in the first conductor connection body 60A. On the other hand, one second folded conductor 55 is provided in the second conductor connection body 60B.

Winding configurations of the first conductor connection body 60A and the second conductor connection body 60B will be described below.

In the first conductor connection body 60A, two end conductors 51 are arranged at both ends of the first conductor connection body 60A, and the first folded conductor 54 is arranged substantially in the middle. The first conductor connection body 60A is wave-wound every six slots toward the other side θ2 in the circumferential direction from the first end 63 to the first folded portion 50*f*. Furthermore, the first conductor connection body 60A is wave-wound every six slots toward one side θ1 in the circumferential direction from the first folded portion 50*f* to the second end 64.

At this point, in the first conductor connection body 60A, the region that is wave-wound on the other side θ2 in the circumferential direction between the first end 63 and the first folded portion 50*f* is referred to as a first portion 61. In the first conductor connection body 60A, the region that is wave-wound on one side θ1 in the circumferential direction between the first folded portion 50*f* and the second end 64 is referred to as a second portion 62. That is, the first conductor connection body 60A includes the first end 63, the first portion 61 wave-wound from the first end 63 to the other side θ2 in the circumferential direction, the first folded portion 50*f* connected to the end portion on the other end θ2 in the circumferential direction of the first portion 61, the second portion 62 wave-wound from the first folded portion 50*f* to one side θ1 in the circumferential direction, and the second end 64 connected to the end portion of one side θ1 in the circumferential direction of the second portion 62.

In the second conductor connection body 60B, two end conductors 51 are arranged at the ends of both ends of the second conductor connection body 60B. The second conductor connection body 60B in which the second folded conductor 55 is arranged substantially in the middle is wave-wound every six slots toward the other side θ2 in the circumferential direction from the first end 63 to the second folded portion 50*g* (first portion 61). Furthermore, the second conductor connection body 60B is wave-wound every six slots toward one side θ1 in the circumferential direction between (second portion 62) the second folded portion 50*g* and the second end 64 that is the second end 64. That is, the second conductor connection body 60B includes the first end 63, the first portion 61 wave-wound from the first end 63 to the other side θ2 in the circumferential direction, the second folded portion 50*g* connected to the end portion of the other side θ2 in the circumferential direction of the first portion 61, the second portion 62 wave-wound from the second folded portion 50*g* to one side θ1 in the circumferential direction, and the second end 64 connected to the end portion of one side θ1 in the circumferential direction of the second portion 62.

The conductor connection body 60 of the embodiment is wave-wound with the number of slots per pole s in the first portion 61 and the second portion 62. That is, the conductor connection body 60 is mounted on the stator core 20 by full pitch winding. For this reason, according to the embodiment, the plurality of conductors 50 arranged in the same slot S are all a part of the conductor connection body 60 having the same phase. Consequently, according to the embodiment, the conductor connection bodies 60 having different phases is not required to be insulated in one slot S, but the insulation is easy to secure.

As illustrated in FIG. 1, in the embodiment, the winding portion 30 includes the first end 63, the second end 64, the crossing portion 50*d*, and folded portions 50*f*, 50*g*. The first end 63, the second end 64, the crossing portion 50*d*, and the folded portions 50*f*, 50*g* configure the coil end 30*e* on the upper side of the stator core 20. On the other hand, the connection portion 50*j* configures the coil end 30*f* on the lower side of the stator core 20.

The ends 63, 64 are disposed on the innermost circumference of the coil end 30*e*. That is, the ends 63, 64 are located on the radial inside of the plurality of crossing portions 50*d*. On the other hand, the folded portions 50*f*, 50*g* are disposed on the outermost circumference of the coil end 30*e*. That is, the folded portions 50*f*, 50*g* are disposed on the radial outside of the plurality of crossing portions 50*d*.

The first end 63 extends upward (one side in the axial direction) from the stator core 20 and is connected to the phase bus bars 70, 80, 90 omitted in FIG. 1. On the other hand, the second end 64 configures the neutral point portion 10. The ends 63, 64 extend above the stator core 20. Accordingly, the neutral point portion 10 is located above the stator core 20.

Figure 5:
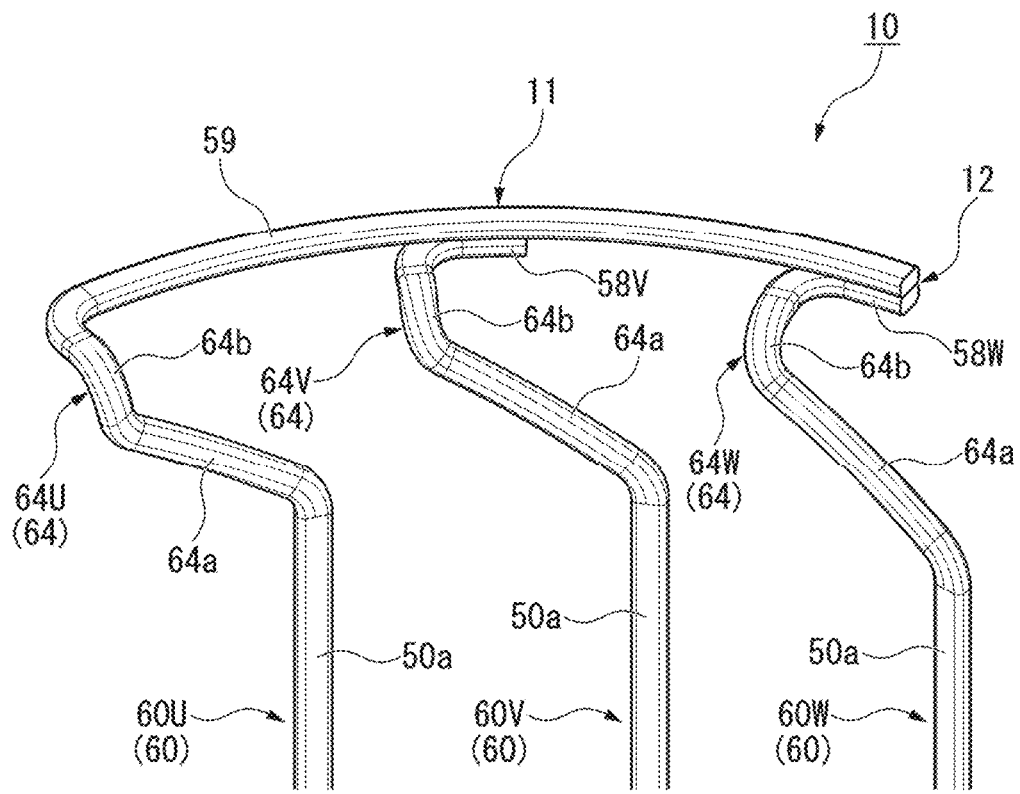
FIG. 5 is a perspective view illustrating a neutral point of the embodiment.

FIG. 5 is a perspective view illustrating the neutral point portion 10 of the embodiment.

The neutral point portion 10 is configured such that the second ends 64 of the U-phase conductor connection body 60U, the V-phase conductor connection body 60V, and the W-phase conductor connection body 60W are connected to each other. In the embodiment, base ends of the U-phase second end 64U, the V-phase second end 64V, and the W-phase second end 64W that configure the neutral point portion 10 are arranged in this order toward the other side θ2 in the circumferential direction.

Each of the three second ends 64 configuring the neutral point portion 10 has an inclination portion 64*a* and a bent portion 64*b*. The inclination portion 64*a* is connected to the upper end of the straight portion 50*a*. The inclination portion 64*a* of the second end 64 is inclined toward one side θ1 in the circumferential direction from the upper end toward the upper side of the straight portion 50*a*. The bent portion 64*b* of the second end 64 is connected to the upper end of the inclination portion 64*a*. The bent portion 64*b* is bent in a hairpin shape from one side θ1 in the circumferential direction toward the other side in the circumferential direction. Furthermore, the bent portion 64*b* extends radially outward from a boundary portion with the bent portion 64*b*.

As illustrated in FIG. 1, the second end 64 of one conductor connection body 60 is adjacent to the first end 63 of another conductor connection body 60 or the second end 64 of another conductor connection body 60 in the circumferential direction. Similarly to the second end 64, the first end 63 includes an inclination portion 63*a* that is inclined toward one side θ1 in the circumferential direction from the upper end toward the upper side of the straight portion 50*a*. The inclination directions of all the inclination portions 63*a*, 64*a* of the first end 63 and the second end 64 are matched with each other. Thus, interference between the first end 63 and the second end 64 is prevented. In addition, a part of the pluralities of first ends 63 and the second ends 64 is adjacent to the crossing portion 50*d* of another conductor connection body 60 in the circumferential direction. Similarly to the inclination portions 63*a*, 64*a*, the crossing portion 50*d* is inclined toward one side θ1 in the circumferential direction from the upper end toward the upper side of the straight portion 50a. That is, the inclination directions of the inclination portions 63a, 64a are matched with the inclination direction of the crossing portion 50d. For this reason, the first end 63 and the second end 64 can be prevented from interfering with the crossing portion 50d.

In the three second ends 64 configuring the neutral point portion 10, the U-phase second end 64U includes a circumferential extension 59. Furthermore, in the three second ends 64, the V-phase, W-phase second ends 64V, 64W include terminal portions 58V, 58W. The circumferential extension 59 and the terminal portions 58V, 58W extend from the bent portion 64b to the other side θ2 in the circumferential direction.

The terminal portions 58V, 58W are arranged side by side in the circumferential direction. The circumferential extension 59 passes above the terminal portions 58V, 58W and comes into contact with the terminal portions 58V, 58W. The circumferential extension 59 is connected to the terminal portions 58V, 58W. The circumferential extension 59 and the terminal portion 58V configure a first connection portion (connection portion) 11. The circumferential extension 59 and the terminal portion 58W configure a second connection portion (connection portion) 12. That is, the second end 64V of the V-phase conductor connection body 60V is connected to the circumferential extension 59 to configure the first connection portion 11, and the second end 64W of the W-phase conductor connection body 60W is connected to the circumferential extension 59 to configure the second connection portion 12.

The two connection portions 11, 12 are connected by welding. When resistance welding is adopted as a welding method, the circumferential extension 59 and the terminal portions 58V, 58V are sandwiched from above and below by electrodes and welded by passing current. As described later in the latter part, in the connection portions 11, 12, an enamel coating is removed from the second ends 64 to be connected to each other.

According to the embodiment, in the three conductor connection bodies 60, the second ends 64 are directly connected to each other to provide the neutral point portion 10, thereby configuring the three-phase circuit. According to the embodiment, the number of parts can be reduced as compared with the case where the end of the conductor connection body is connected to the bus bar to configure the neutral point.

According to the embodiment, the neutral point portion 10 includes two connection portions 11, 12 to which two different combinations of the second ends 64 of the three conductor connection bodies 60 are connected. Accordingly, the neutral point portion 10 includes two connection portions 11, 12 arranged along the circumferential direction. For this reason, the neutral point portion 10 is configured in a portal shape extending from the winding portion 30. Thus, rigidity of the neutral point portion 10 is increased. Even when the vibration is applied to the neutral point portion 10, the neutral point portion 10 hardly resonates, and the stress applied to the connection portions 11, 12 of the neutral point portion 10 can be decreased. Consequently, according to the embodiment, the connection portions 11, 12 with the neutral point portion 10 are hardly damaged.

According to the embodiment, the connection portions 11, 12 of the neutral point portion 10 are connected to the two second ends 64. That is, according to the embodiment, at least three second ends 64 are not required to be joined in the connection portions 11, 12. For this reason, welding can be stably performed when the connection portions 11, 12 are formed by welding means such as resistance welding.

As illustrated in FIG. 1, the winding portion 30 of the embodiment includes a plurality of (four in the embodiment) neutral point portions 10. The four neutral point portions 10 are divided into two groups of a first group G1 and a second group G2. The two neutral point portions 10 of each group G1 and G2 are arranged side by side in the radial direction. That is, according to the embodiment, at least two neutral point portions 10 are arranged side by side in the radial direction.

According to the embodiment, by arranging the plurality of neutral point portions 10 in the radial direction, the connection portions 11, 12 of the neutral point portion 10 can be arranged side by side in the radial direction. Thus, in the connection process between the second ends 64 in the connection portions 11, 12, a moving distance of a connection jig can be shortened, and as a result, a tact time required for the connection process can be shortened. Furthermore, compared with the case where the plurality of neutral point portions 10 are laminated in the axial direction, the neutral point portion 10 can be prevented from protruding in the axial direction with respect to the coil end 30e, and the motor 1 can be miniaturized.

Figure 6:
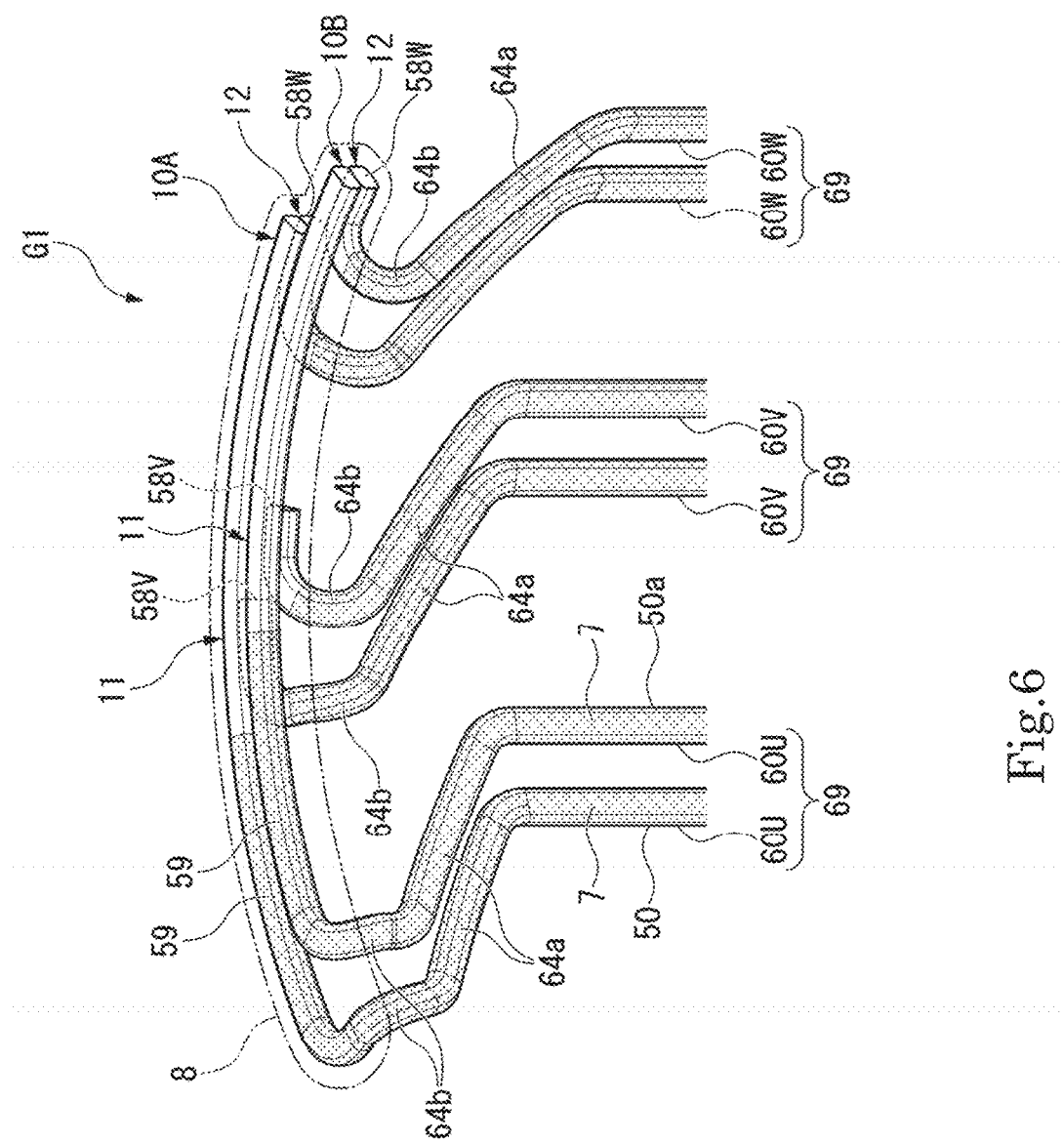
FIG. 6 is a perspective view illustrating two neutral points of the embodiment.

FIG. 6 is a perspective view illustrating the two neutral point portions 10 of the first group G1 (or the second group G2). The two U-phase conductor connection bodies 60U connected to the two neutral point portions 10 arranged in the radial direction pass through the slots S adjacent to each other in the circumferential direction. Furthermore, the two V-phase conductor connection bodies 60V connected to the two neutral point portions 10 arranged in the radial direction pass through the slots S adjacent to each other in the circumferential direction. Furthermore, the two W-phase conductor connection bodies 60W connected to the two neutral point portions 10 arranged in the radial direction pass through the slots S adjacent to each other in the circumferential direction. In this way, the in-phase conductor connection bodies 60 connected to the two neutral point portions 10 arranged in the radial direction pass through the slots S adjacent to each other in the circumferential direction to configure the connection body pair 69.

At this point, in the two neutral point portions 10 arranged in the radial direction, one located radially outside is referred to as a first neutral point portion 10A, and the other located radially inside is referred to as a second neutral point portion 10B. The radial length of the bent portion 64b of the first neutral point portion 10A is longer than the radial length of the bent portion 64b of the second neutral point portion 10B.

The second end 64 extends from the end on the radial inside of the coil end 30e to the upper side and the radial outside of the coil end 30e, and is connected to the neutral point portion 10. For this reason, the second end 64 connected to the first neutral point portion 10A extends from the radial inside to the radial outside of the second neutral point portion 10B. The second end 64 of the conductor connection body 60 connected to the first neutral point portion 10A passes below or above the second neutral point portion 10B at the bent portion 64b.

According to the embodiment, the second end 64 connected to the first neutral point portion 10A is disposed so as to overlap the second neutral point portion 10B in the axial direction. Almost no current flows between the neutral point portions 10 even when the neutral point portions 10 come into contact with each other. Accordingly, the second end 64 connected to the first neutral point portion 10A and the second neutral point portion 10B can be disposed close to each other in the axial direction, and spaces where the two neutral point portions 10 are disposed can be miniaturized in the axial direction.

In the embodiment, the case where the second end 64 extends from the radial inside of the coil end 30e has been described. However, the second end 64 may extend from the radial outside of the coil end 30e. That is, the second end 64 may extend from the end on one side in the radial direction of the coil end 30e toward the upper side and the other side in the radial direction of the coil end 30e and be connected at the neutral point portion 10. Furthermore, in this case, in the two neutral point portions arranged in the radial direction, the second end 64 of the conductor connection body 60 connected to the neutral point portion 10 located on the other side in the radial direction may pass through one side or the other side in the axial direction of the neutral point portion located on one side in the radial direction.

As illustrated in FIG. 4, the surface of the conductor 50 is coated with an enamel coating (first coating) 7 that is an insulating coating. The surface of the conductor 50 is exposed from the enamel coating 7 at the connection portions 11, 12. Furthermore, the conductor 50 is coated with a coating portion (second coating) 8 from above the connection portions 11, 12. Thus, the portion where the surface is exposed from the enamel coating 7 is coated with the insulating coating portion 8. According to the embodiment, the conductors 50 can be electrically connected to each other at the second end 64, and certainty of the insulation from the other conductors 50 can be enhanced.

In the embodiment, the plurality of neutral point portions 10 arranged in the radial direction are coated by one coating portion 8. According to the embodiment, because the plurality of neutral point portions 10 are arranged side by side in the radial direction, the plurality of neutral point portions 10 can be collectively coated to form the coating portion 8, and the coating process can be simplified. In this embodiment, for example, the coating portion 8 is formed by powder coating. The coating portion 8 may be an insulating tape.

Figure 7:
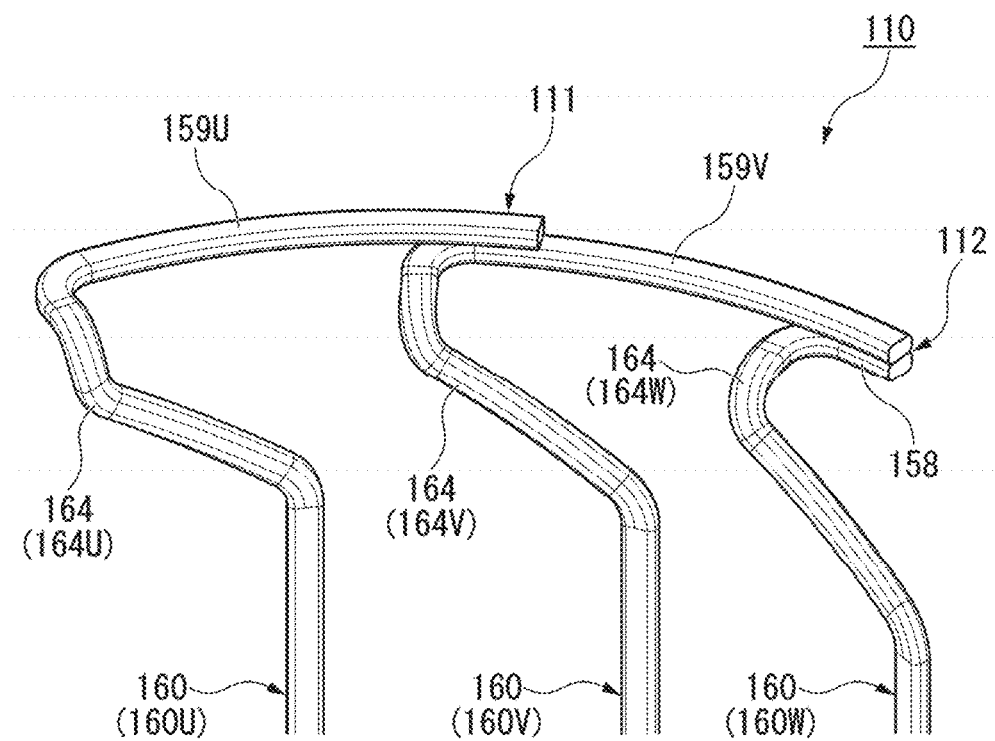
FIG. 7 is a perspective view illustrating a neutral point according to a modification of the embodiment.

FIG. 7 is a perspective view illustrating a neutral point portion 110 according to a modification of the embodiment.

Second ends 164 of the three conductor connection bodies 160 (U-phase conductor connection body 160U, V-phase conductor connection body 160V, W-phase conductor connection body 160W) are electrically connected to configure the neutral point portion 110.

A second end 164U of the U-phase conductor connection body 160U includes a first circumferential extension 159U extending to the other side θ2 in the circumferential direction. A second end 164V of the V-phase conductor connection body 160V includes a second circumferential extension 159V extending to the other side θ2 in the circumferential direction. A second end 164W of the W-phase conductor connection body 160W includes a terminal portion 158.

The first circumferential extension 159U extends to the upper side of the second circumferential extension 159V to come into contact with the second circumferential extension 159V. The first circumferential extension 159U is connected to the second circumferential extension 159V. The first circumferential extension 159U and the second circumferential extension 159V configure a first connection portion (connection portion) 111.

The second circumferential extension 159V extends to the upper side of the terminal portion 158 to come into contact with the terminal portion 158. The second circumferential extension 159V is connected to the terminal portion 158. The second circumferential extension 159V and the terminal portion 158 configure a second connection portion (connection portion) 112.

According to the modification, the neutral point portion 110 includes two connection portions 111, 112 to which two different combinations of the second ends 164 of the three conductor connection bodies 160 are connected, so that the rigidity is increased. Thus, even when the vibration is applied to the neutral point portion 110, the connection portions 111, 112 are hardly damaged.

Although the embodiment of the present invention is described above, structures in the embodiment are examples, and thus addition, elimination, replacement of structure, and other modifications can be made within a range without departing from the spirit of the present invention. Also note that the present invention is not limited by the embodiment.

For example, in the embodiment, the case where the motor 1 is the three-phase motor has been described. However, the motor 1 may be another motor such as a five-phase motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor rotatable about a center axis line; and
a stator disposed on a radial outside of the rotor,
wherein the stator includes:
a winding portion including a plurality of conductor connection bodies in which a plurality of conductors are connected in series; and
a stator core in which a plurality of slots through which the conductor connection body passes are provided,
the winding portion includes a neutral point portion located on one side in an axial direction of the stator core, ends of the three conductor connection bodies being electrically connected to the neutral point portion, and
the neutral point portion includes two connection portions to which two of different combinations of the ends of the three conductor connection bodies are connected.

2. The motor according to claim 1, wherein
a plurality of conductor connection bodies are classified into a first phase conductor connection body, a second phase conductor connection body, and a third phase conductor connection body,
the end of the first phase conductor connection body includes a circumferential extension extending in a circumferential direction,
the end of the second phase conductor connection body is connected to the circumferential extension to configure the connection portion, and
the end of the third phase conductor connection body is connected to the circumferential extension portion to configure the connection portion.

3. The motor according to claim 1, wherein
a plurality of conductor connection bodies are classified into a first phase conductor connection body, a second phase conductor connection body, and a third phase conductor connection body, the end of the first phase conductor connection body includes a first circumferential extension extending in a circumferential direction, the end of the second phase conductor connection body includes a second circumferential extension that is connected to the first circumferential extension to configure the connection portion and extends in the circumferential direction, and the end of the third phase conductor connection body is connected to the second circumferential extension to configure the connection portion.

4. The motor according to claim 1, wherein
the winding portion includes a plurality of neutral point portions, and
at least two neutral point portions are arranged side by side in the radial direction.

5. The motor according to claim 4, wherein
the winding portion includes a coil end located on one side in the axial direction of the stator core,
the end of the conductor connection body extends from the end on one side in the radial direction of the coil end to one side in the axial direction and the other side in the radial direction of the coil end, and is connected at the neutral point portion, and in the two neutral point portions arranged in the radial direction, the end of the conductor connection body connected to a first neutral point portion located on the other side in the radial direction passes through one side or the other side in the axial direction of a second neutral point portion located on one side in the radial direction.

6. The motor according to claim 1, wherein
a surface of the conductor is coated with an insulating first coating, and
the surface of the conductor is exposed from the first coating at the connection portion and coated with a second coating from above the connection portion.

* * * * *